United States Patent
St. Jean

(10) Patent No.: US 6,795,542 B1
(45) Date of Patent: Sep. 21, 2004

(54) SMART TRANSFER FOR ANSWER POSITIONS

(75) Inventor: Richard St. Jean, Kanata (CA)

(73) Assignee: Mitel Corporation (CA)

( * ) Notice: Subject to any disclaimer, the term of this patent is extended or adjusted under 35 U.S.C. 154(b) by 0 days.

(21) Appl. No.: 09/320,108

(22) Filed: May 26, 1999

(30) Foreign Application Priority Data

May 26, 1998 (GB) .............................................. 9811293

(51) Int. Cl.[7] .............................................. H04M 3/42
(52) U.S. Cl. ............................. 379/212.01; 379/211.01
(58) Field of Search ........................ 379/207.14, 207.15, 379/211.01, 211.02, 212.01, 265.01, 266.01

(56) References Cited

U.S. PATENT DOCUMENTS

| | | | |
|---|---|---|---|
| 4,885,771 A | * 12/1989 | Rabideau et al. | ........... 379/354 |
| 5,309,509 A | * 5/1994 | Cocklin et al. | ............. 379/165 |
| 5,347,574 A | 9/1994 | Morganstein | |
| 5,506,890 A | 4/1996 | Gupta et al. | |
| 5,537,470 A | 7/1996 | Lee | |
| 5,848,143 A | * 12/1998 | Andrews et al. | ........ 379/265.09 |
| 5,923,745 A | * 7/1999 | Hurd | ...................... 379/265.02 |
| 6,052,372 A | * 4/2000 | Gittins et al. | ................ 370/396 |
| 6,292,555 B1 | * 9/2001 | Okamoto | ............... 379/265.01 |

* cited by examiner

*Primary Examiner*—Bing Q. Bui
(74) *Attorney, Agent, or Firm*—Jones Day

(57) ABSTRACT

A method for transfer of incoming calls received by an attendant comprising the steps of obtaining the caller identification of the incoming call, initiating a search on a database using the caller identification, retrieving a list of previous call transfer destinations from the database corresponding to the caller identification, displaying the list on an attendant console contemporaneous with the incoming call, and selecting a desired transfer destination from the list on the console thereby transferring the incoming call to the desired transfer destination.

32 Claims, 2 Drawing Sheets

SMART TRANSFER FOR ANSWER POSITIONS

This application claims priority from British Application No. 9811293.1 filed on May 26, 1998.

FIELD OF THE INVENTION

This invention relates in general to the field of telephony and in particular provides a method and system for intelligent call transfer of incoming calls.

BACKGROUND OF THE INVENTION

A typical organization is characterized by having a number of individuals, which may be grouped by functional area or department, each accessible by telephone. Typically, each person has their own telephone connected to a private branch exchange (PBX) operated by the organization, and has their own extension number, which is accessible through a main organizational switchboard. An outside person who desires to contact a person within the organization calls a common central organizational telephone number and request the attendant, sitting at a switchboard or console, to transfer the call to the desired person. This is a difficult task, for it requires the attendant to know the names and associated extension numbers of every person in the organization. For large organizations, the caller must wait while the attendant looks up and locates the called person's name in a directory before transferring the call. In addition, where the caller does not know the surname, or the spelling of the last name, significant time and effort can be spent, while the caller waits, before the correct callee is identified.

In the field of telephony, telephone companies who provide standard telephone service to individuals and organizations offer a service where the identity of the caller is communicated to the callee at the time of placement of the call. Thus, by the time the phone starts to ring, the callee can ascertain the identity of the caller.

There are also known in the art various application programming interfaces (APIs), such as the TAPI specification for the Microsoft® Window™ environment, which facilitate the provision of telephony related services by a personal computer. As such, computer applications can be notified about calls, answer calls, hold calls and perform other call and switch related functions as if the application is the end-point of the call.

SUMMARY OF THE INVENTION

This invention provides a system and method to speed up call transfer activity performed by an attendant. It takes advantage of the fact that most callers repeatedly call the same person or subset of people at an organization. Using the caller identification information provided by the telephone company, a database is created which stores information on each incoming call and maintains a record or log of the transfer destination. When a later call arrives from the same caller, the attendant is presented on the graphical interface console a list of previous transfer destinations which are likely destinations for the current call. The attendant can then transfer the call to one of the destinations presented on the list by merely selecting the desired item on the list, which signals the telephone exchange, transferring the call to the desired destination. This provides a simple, efficient means to transfer the call, without requiring the attendant to do a directory search for the name or identity of the proposed call destination. Additional information can also be provided on the console such as the status of the person being called, and call destination alternatives should the person being call not be available. This reduces the number of calls transferred to unreceptive destinations, and increased the likelihood of quick, successful call connection to a useful destination for the caller. The invention could also be employed in automated attendant environments where upon answering the incoming call, the automated attendant presents the list of previous destinations called to the caller early during the call, obviating the frustrating need of a caller to navigate time consuming multi-menu messaging systems to connect to a frequently called destination. Therefore, according to one aspect of the present invention, there is provided a method for transfer of incoming calls received by an attendant comprising the steps of:

(a) obtaining the caller identification of the incoming call;
(b) initiating a search on a database using the caller identification;
(c) retrieving a list of previous call transfer destinations from the database corresponding to the caller identification;
(d) displaying the list on an attendant console contemporaneous with the incoming call;
(e) selecting a desired transfer destination from the list on the console thereby transferring the incoming call to the desired transfer destination. Also, according to a further aspect of the present invention, there is provided a method for transfer of incoming calls received by an automated attendant comprising the steps of:

(a) obtaining the caller identification of the incoming call;
(b) initiating a search on a database using the caller identification;
(c) retrieving a list of previous call transfer destinations from the database corresponding to the caller identification;
(d) presenting the list to the caller of the incoming call;
(e) selecting a desired transfer destination from the list presented to the caller thereby transferring the incoming call to the desired transfer destination. According to a further aspect of the present invention there is provided a system for transfer of incoming calls received by an attendant, the system comprising:

(a) means for switching the incoming call;
(b) caller identification means for obtaining the caller identification of said incoming call;
(c) database means containing previous call transfer destination information;
(d) console means coupled to said switching means and caller identification means and said database, having:
  (i) means for handling the audio aspect of said incoming call;
  (ii) means for searching and retrieving from said database a list of said previous call transfer destination information corresponding to said caller identification;
  (iii) means for displaying said list contemporaneous with said incoming call;
  (iv) means for selecting a desired transfer destination from said list to switch said incoming call to said desired transfer destination.

According to a further aspect of the present invention, there is provided a system for transfer of incoming calls received by an automated attendant, the system comprising:

(a) means for switching the incoming call;

(b) caller identification means for obtaining the caller identification of said incoming call;

(c) database means containing previous call transfer destination information;

(d) automated attendant means coupled to said switching means and caller identification means and said database, having:

(i) means for searching and retrieving from said database a list of said previous call transfer destination information corresponding to said caller identification;

(ii) means for presenting said list to an incoming caller upon answering said incoming call;

(iii) means for receiving a selection of a desired transfer destination from said list to switch said incoming call to said desired transfer destination.

BRIEF DESCRIPTION OF THE DRAWINGS

A detailed description of the preferred embodiments is provided herein below, with reference to the following drawings in which.

DETAILED DESCRIPTION OF THE PREFERRED EMBODIMENT

Figure 1:
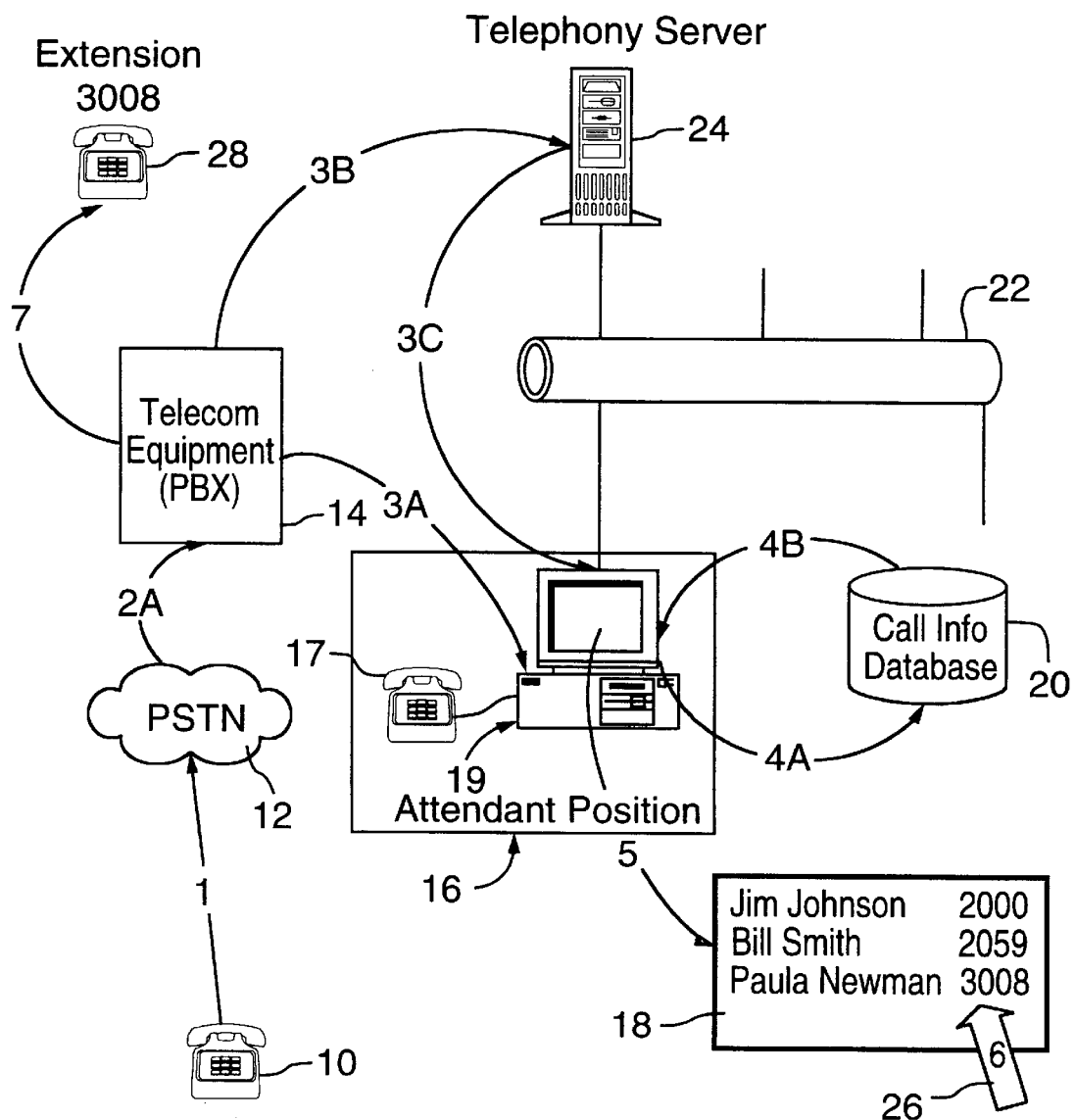
FIG. 1 is a block diagram overview of a call transfer utilizing the present invention.

Turning to FIG. 1, there is provided an example of an incoming call transfer according to the present invention where a caller placing the call wishes to contact a person at an organization by calling a centralized number. The caller, using originating terminal 10 places a regular telephone call through the Public Switched Telephone Network (PSTN) 12 operated by the telephone company. The PSTN, through central office switches, routes the call to the destination organization's telecom equipment, typically a PBX 14. The PBX 14 may be optionally connected to local area network 22. The PBX 14 also receives the caller's identification (Call ID), usually the calling telephone number, using the Calling Line ID (CLID) feature or Automatic Number Identification (ANI) feature supplied by the central office of the PSTN 12 and can optionally receive other information related to the call supplied by the central office. The PBX 14 then presents the call and caller information to the attendant at the attendant's console 16. In one embodiment, the console 16 is a composite device, having a standard audio interface, such as a dialing/button pad interface and handset 17, or headset or speaker/microphone set for a human attendant typically connected to the PBX 14, and a processor component with access to either an external or internal database of call information stored in a disk or random access memory and visual user interface 18 capable of display of information from a database 20. The dialing/button pad interface may optionally be incorporated in the visual user interface 18 or the entire console 16 may be combined into a unitary device. In the preferred embodiment, the console 16 has a telephone handset 17 and an accompanying personal computer 19, running an operating system with a graphical user interface such as Windows95™ and storing call information in database 20 in local disk memory. The console 16 is optionally connected to a local area network 22. The database 20 stores the Call ID of previous incoming calls as well as the associated transfer destinations for each of those incoming calls, typically the extension number of the person to whom the call was transferred. The database 20 may optionally store the date and time of the incoming call, the frequency of calls to a number, the current status of each person at each extension, and other like relevant information about the caller and the destination extensions.

In an alternate embodiment, the PBX 14 is typically connected to a telephony server 24, which is also connected to local area network 22. In this alternate embodiment, the PBX 14 presents the incoming call from PSTN 12 to telephony server 24 which then sends the call and caller information to the attendant at the attendant's console 16.

The caller information provided to the console 16 consists of the Call ID and optionally the caller's name. The console, upon receiving the Call ID, initiates a search on the database 20 using the Call ID to retrieve a list of previous transfer destinations of this caller. The results of the search, which can include the caller's name and number, and the name and extension numbers of the previous transfer destinations, are then displayed on the visual user interface 18 of the console 16. Since most callers to an organization typically call the same person or small group of people at the organization, it is likely that the desired transfer destination is on this list. The call is then answered by the attendant at console 16 and the caller then indicates to the attendant the desired transfer destination. If the transfer destination is matched on the list of user interface 18, then the attendant, using a suitable pointing device such as a mouse with arrow pointer 26, selects the desired transfer destination from user interface 18 and the console 16 preferably stores or logs the chosen transfer destination in database 20 and signals the PBX 14 to transfer the call to transfer destination terminal 28. In this manner, the transfer is completed in a single step by selection of the appropriate choice from the list by the attendant obviating the need of the attendant to resort to a directory search. In the event that a caller wishes to be transferred to a person not on the transfer list of user interface 18, then the attendant must use traditional means to transfer the call, which would be logged in the database 20.

In an alternate embodiment, when the attendant selects the desired transfer destination, the console 16 sends the message to the telephony server 24 through local area network 22 to transfer the call. The telephony server 24 then sends the message to PBX 14 to transfer the call to transfer destination terminal 28.

With respect to the transfer list displayed on user interface 26, the list may be sorted alphabetically, by date, by frequency (ie. the person most often called is placed first) or any other useful manner.

Optionally, the transfer list may show as a separate attribute, the current status of the person at the desired transfer destination to whom the caller wishes to be transferred. For example, if the line of the person at the desired transfer destination is busy, a "busy" attribute could be displayed on user interface 18. Likewise, if the person at the desired transfer destination is out of the office, or requests not to be disturbed, such information could be presented on the user interface 18 of console 16. Such status information could be provided to the console 18 by the PBX 14, or entered into the database 20 by the attendant or others using standard networked database access programs. Further, in cases where the transfer destination is unavailable, the transfer list could also display alternate destinations for the caller, such as a backup person, secretary, cell phone number or home phone number of a person out of the office. The attendant could then inform the caller of the desired transfer destination status and take the appropriate action on the caller's instructions without requiring the caller to be transferred to an undesired or unreceptive destination. In this way, useful information is provided in an efficient and effective manner to the caller, increasing the likelihood that a caller will be transferred to a useful destination.

Figure 2:
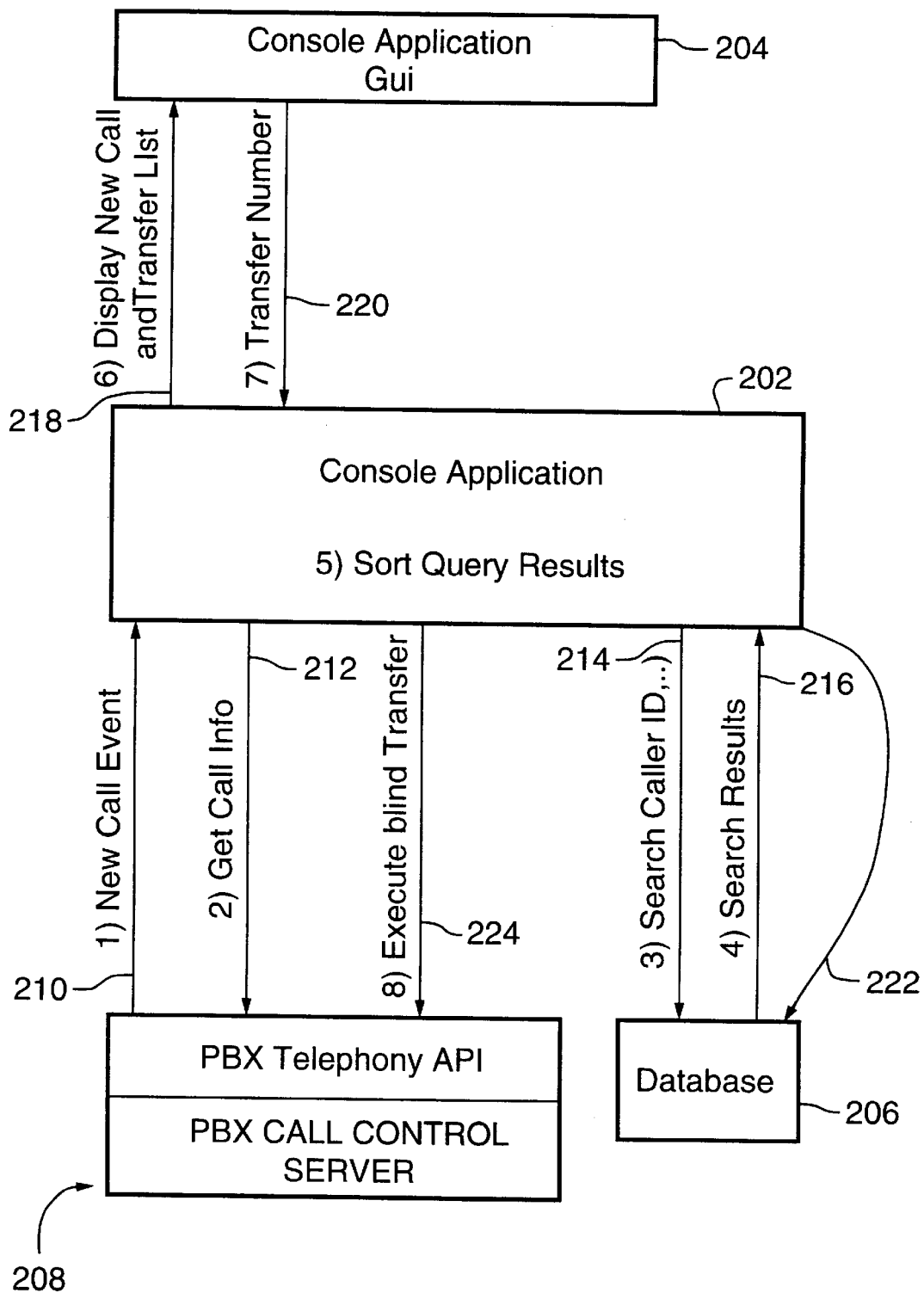
FIG. 2 is a block diagram of the message flow between the console and call control server of the present invention.

Turning to FIG. 2, the message flow between console components and the call control server is further illustrated. In the preferred embodiment, the console 18 of FIG. 1 can be implemented by console application 202 and graphical user interface 204. Preferably, the console application 202 is a program, written in an appropriate computer language, which displays information on graphical user interface 204, requests searches and sorts search results from database 206, and sends and receives messages from call control server 208. Call control server 208 is typically a PBX or a telephony server as described with respect to FIG. 1. Console application 202 communicates with call control server 208 using any appropriate well known telephony Application Program Interface (API) such as TSAPI, JTAPI or TAPI by Microsoft™.

When an incoming call is received by call control server 208, it passes a new call event message 210 to console application 202. Console application 202 then sends a get call info message 212 to call control server 208 to obtain the caller id and optionally any related information such as caller name, trunk id, etc. Console application then initiates a database search request 214 using the caller id, on database 206. The database 206 may be local to the console, or distributed across a local or wide area network. The database search request 214 could be implemented using any well known database protocol such as Open Database Connect (ODBC) on a suitable database. The database 206 would return the search results 216 of the previous call transfers of the caller id, and any optional information such as destination status, date of call, etc. The console 202 then sorts the database results. The sorted results and the new call are then sent as a transfer list message 218 to the user interface 204 for display. At the same time, the call is presented and answered by the attendant. When the attendant ascertains from the caller the desired destination, the attendant selects the appropriate transfer destination from the list on the user interface 204, and the selection is communicated to the console application 202 in transfer number selection message 220. Console application 202 then logs and records the selection by sending an add record message 222 to the database 206 storing the Call id, transfer destination, date, time and other desired log information. Console application then sends an execute transfer message 224 to call control server 208 to transfer the call to the appropriate destination.

In an alternate embodiment, the smart transfer mechanism of the present invention could be implemented in an automated attendant. The automated attendant is implemented in conjunction with the console application 202 of FIG. 2, and would obtain and sort the database search results in the same manner as described above. As an alternative, the automated attendant and console functions could be entirely implemented in the telephony server 24 with the telephony server 24 connected to the PBX 14 and to the database 20. The automated attendant would sort the search results using an appropriate metric, such as most frequently called, or most recently called, and play a message reading out the names of the most recently called people. For example, where the search results are sorted in order of most recently called, and the two most recently called people are Tom Smith and Jack Jones, an automated attendant, when answering a call could say "Welcome to company XYZ. To contact Tom Smith, press 1, to contact Jack Jones, press 2, for and operator, press 0." When the caller presses the appropriate number, the automated attendant would then transfer the call in a similar manner as described above. In this way, a frequent caller would not be required to navigate lengthy and tedious automated phone answering systems to connect to the desired person.

Although the invention has been described in terms of the preferred and several alternate embodiments described herein, those skilled in the art will appreciate other embodiments and modifications which can be made without departing from the spirit and scope of the teachings of the invention. All such modifications are intended to be included with the scope of the claims appended hereto.

I claim:

1. A method for transfer of incoming calls received by an attendant comprising the steps of:
    (a) obtaining the caller identification of the incoming call;
    (b) initiating a search on a database using said caller identification;
    (c) retrieving a list of previous call transfer destinations from said database corresponding to said caller identification;
    (d) displaying said list on an attendant console contemporaneous with said incoming call;
    (e) receiving a selection, from said attendant, and a desired transfer destination from said list on said console;
    (f) thereby transferring said incoming call to said desired transfer destination in response to receiving said selection.

2. The method of claim 1 having the additional step of storing a record of said desired transfer destination in said database.

3. The method of claim 1 wherein said database is located across a network.

4. The method of claim 1 wherein said list includes the name of said previous call transfer destinations.

5. The method of claim 4 wherein said list is sorted in order of most frequent transfer destination for said call identification.

6. The method of claim 4 wherein said list is sorted in order of most recent transfer destination for said call identification.

7. The method of claim 4 wherein said list is sorted in alphabetical order according to said name of said transfer destination for said caller identification.

8. The method of claim 4 wherein said list includes the current status of said previous transfer destinations.

9. A method for transfer of incoming calls received by an automated attendant comprising the steps of:
    (a) obtaining the caller identification of the incoming call;
    (b) initiating a search on a database using said caller identification;
    (c) retrieving a list of previous call transfer destinations from said database corresponding to said caller identification;
    (d) presenting said list to the caller of said incoming call;
    (e) receiving a selection from said caller of said incoming call, of a desired transfer destination from said list presented to said caller;
    (f) thereby transferring said incoming call to said desired transfer destination in response to receiving said selection.

10. The method of claim 9 including the additional step of storing a record of said desired transfer destination in said database.

11. The method of claim 9 wherein said database is located across a network.

12. The method of claim 9 wherein said list includes the name of said previous call transfer destinations.

13. The method of claim 12 wherein said list is sorted in order of most frequent transfer destination for said caller identification.

14. The method of claim 12 wherein said list is sorted in order of most recent transfer destination for said caller identification.

15. The method of claim 12 wherein said list is sorted in alphabetical order according to said name of said transfer destination for said caller identification.

16. The method of claim 12 wherein said list includes the current status of said previous transfer destinations.

17. A system for transfer of incoming calls received by an attendant, the system comprising:
(a) caller identification means for obtaining the caller identification of said incoming call;
(b) database means containing previous call transfer destination information;
(c) console means coupled to said switching means and caller identification means and said database, having:
(i) means for handling the audio aspect of said incoming call;
(ii) means for searching and retrieving from said database a list of said previous call transfer destination information corresponding to said caller identification;
(iii) means for displaying said list contemporaneous with said incoming call; and
(iv) means for receiving a selection, from said attendant, of a desired transfer destination from said list; and
(d) means coupled to said console means, for switching said incoming call based on the selection of said desired transfer destination.

18. The console means of claim 17 having additional means of storing a record of said desired transfer destination in said database means.

19. The system of claim 17 wherein said console means is coupled to said switching means and caller identification means and said database through a local area network.

20. The system of claim 17 wherein said console means is a personal computer.

21. The system of claim 17 wherein said caller identification means is a telephony server.

22. The system of claim 17 wherein said means for handling the audio aspect of said incoming call is incorporated in said console means.

23. The system of claim 17 wherein said previous call transfer destination information includes the name of said previous call transfer destinations.

24. The system of claim 23 wherein said console means includes means for sorting said list in order of most frequent transfer destination or most recent transfer destination or alphabetical order for said caller identification.

25. The system of claim 23 wherein said previous call transfer destination information includes the current status of said previous transfer destinations.

26. A system for transfer of incoming calls received by an automated attendant, the system comprising:
(a) caller identification means for obtaining the caller identification of said incoming call;
(b) database means containing previous call transfer destination information;
(c) automated attendant means coupled to said caller identification means and said database, having:
(i) means for searching and retrieving from said database a list of said previous call transfer destination information corresponding to said caller identification.
(ii) means for presenting said list to an incoming caller upon answering said incoming call; and
(iii) means for receiving a selection from said incoming caller, of a desired transfer destination from said list coupled to said automated attendant means; and
(d) means for switching said incoming call based on said selection of the desired transfer destination.

27. The automated attendant means of claim 26 having additional means of storing a record of said desired transfer destination in said database means.

28. The system of claim 26 wherein said automated attendant means is coupled to said switching means and caller identification means and said database through a local area network.

29. The system of claim 26 wherein said automated attendant means is incorporated in a telephony server.

30. The system of claim 26 wherein said previous call transfer destination information includes the name of said previous call transfer destinations.

31. The system of claim 30 wherein said automated attendant means includes means for sorting said list in order of most frequent transfer destination or most recent transfer destination or alphabetical order for said caller identification.

32. The system of claim 30 wherein said previous call transfer destination information includes the current status of said previous transfer destinations.

* * * * *